(12) United States Patent
Frank et al.

(10) Patent No.: US 11,640,335 B2
(45) Date of Patent: May 2, 2023

(54) MULTIPLE FUNCTION LEVEL RESET MANAGEMENT

(71) Applicant: Western Digital Technologies, Inc., San Jose, CA (US)

(72) Inventors: Erez Frank, Kokav Yair (IL); Shay Benisty, Beer Sheva (IL); Amir Segev, Meiter (IL)

(73) Assignee: Western Digital Technologies, Inc., San Jose, CA (US)

( * ) Notice: Subject to any disclaimer, the term of this patent is extended or adjusted under 35 U.S.C. 154(b) by 73 days.

(21) Appl. No.: 17/348,519

(22) Filed: Jun. 15, 2021

(65) Prior Publication Data

US 2022/0398154 A1   Dec. 15, 2022

(51) Int. Cl.
| | |
|---|---|
| *H03M 13/09* | (2006.01) |
| *H04L 1/00* | (2006.01) |
| *G06T 1/20* | (2006.01) |
| *G06F 9/50* | (2006.01) |
| *G06F 3/06* | (2006.01) |
| *G11C 7/10* | (2006.01) |

(Continued)

(52) U.S. Cl.
CPC ...... *G06F 11/1068* (2013.01); *G06F 11/0772* (2013.01); *G06F 13/1673* (2013.01); *G06F 13/28* (2013.01); *G06F 13/4059* (2013.01); *G06F 13/423* (2013.01); *G06F 2213/0026* (2013.01)

(58) Field of Classification Search
CPC ............. G06F 11/1068; G06F 11/0772; G06F 13/1673; G06F 13/28; G06F 13/4059; G06F 13/423; G06F 2213/0026
See application file for complete search history.

(56) References Cited

U.S. PATENT DOCUMENTS

| | | | | |
|---|---|---|---|---|
| 4,951,280 A | * | 8/1990 | McCool | ................ H04L 12/437 370/402 |
| 5,495,606 A | | 2/1996 | Borden et al. | |

(Continued)

FOREIGN PATENT DOCUMENTS

| | | |
|---|---|---|
| CN | 104751889 A | 7/2015 |
| KR | 10-2017-0012674 A | 2/2017 |

OTHER PUBLICATIONS

International Search Report and Written Opinion issued in corresponding International Patent Application No. PCT/US2020/023406, dated Jul. 8, 2020 (9 pages).

*Primary Examiner* — Guy J Lamarre
(74) *Attorney, Agent, or Firm* — Patterson + Sheridan, LLP; Steven H. VerSteeg (57) ABSTRACT

The controller is configured to receive commands from a host device through a PCIe bus having a MAC, send data to the host device through the PCIe bus, and execute a function level reset (FLR) command. The controller includes a direct memory access (DMA) unit and either a drain unit or a drain and drop unit coupled between the DMA and the PCIe bus. The units are configured to prevent transactions associated with the FLR command to pass from the DMA to the MAC during execution of the FLR command, where the preventing transactions comprises receiving a request from the DMA, storing the request in a pipe, removing the request from the pipe, and providing a response to the DMA without delivering the request to the MAC. The drain and drop unit is configured to drop a MAC generated response.

20 Claims, 7 Drawing Sheets

(51) Int. Cl.
    *G06F 11/10*     (2006.01)
    *G11C 8/10*     (2006.01)
    *G06F 11/07*     (2006.01)
    *G06F 13/16*     (2006.01)
    *G06F 13/42*     (2006.01)
    *G06F 13/28*     (2006.01)
    *G06F 13/40*     (2006.01)

(56) References Cited

U.S. PATENT DOCUMENTS

| | | | |
|---|---|---|---|
| 5,970,069 A * | 10/1999 | Kumar | H04L 69/12 370/402 |
| 6,134,656 A * | 10/2000 | LaBerge | G06F 1/24 713/400 |
| 6,256,695 B1 | 7/2001 | Williams | |
| 6,496,890 B1 * | 12/2002 | Azevedo | G06F 13/28 710/110 |
| 6,647,450 B1 * | 11/2003 | Kaplinsky | G06F 13/4204 710/310 |
| 7,225,278 B1 * | 5/2007 | Baxter | G06F 13/28 710/33 |
| 7,349,844 B2 | 3/2008 | Staiger | |
| 7,415,568 B2 | 8/2008 | Kawabata et al. | |
| 7,783,037 B1 * | 8/2010 | Bong | H04L 9/0631 380/37 |
| 7,974,996 B1 * | 7/2011 | North | G06F 9/3885 708/524 |
| 8,365,012 B2 | 1/2013 | Yagi | |
| 8,719,646 B2 | 5/2014 | He et al. | |
| 9,201,682 B2 | 12/2015 | Cheng et al. | |
| 9,990,023 B2 | 6/2018 | Paley et al. | |
| 10,540,219 B2 | 1/2020 | Tomlin | |
| 10,719,267 B2 | 7/2020 | Rai et al. | |
| 10,860,333 B1 * | 12/2020 | Benisty | G06F 9/4411 |
| 2007/0240018 A1 | 10/2007 | Nalawadi et al. | |
| 2012/0004011 A1 | 1/2012 | Chun | |
| 2014/0223213 A1 | 8/2014 | Yamazaki et al. | |
| 2015/0052317 B1 | 2/2015 | Grunzke | |
| 2017/0024139 A1 | 1/2017 | Shim et al. | |
| 2017/0168747 A1 | 6/2017 | Han et al. | |
| 2018/0349301 A1 | 12/2018 | Canepa | |
| 2019/0050295 A1 | 2/2019 | Ding et al. | |
| 2019/0171385 A1 | 6/2019 | Caraccio et al. | |
| 2019/0188153 A1 | 6/2019 | Benisty et al. | |
| 2020/0042241 A1 * | 2/2020 | Nakano | G06F 11/0769 |
| 2020/0167226 A1 * | 5/2020 | Gomyo | G06F 9/30145 |
| 2020/0410328 A1 * | 12/2020 | Jacob | G06N 3/063 |

* cited by examiner

MULTIPLE FUNCTION LEVEL RESET MANAGEMENT

BACKGROUND OF THE DISCLOSURE

Field of the Disclosure

Embodiments of the present disclosure generally relate to non-volatile memory (NVM) express (NVMe) function level reset (FLR) commands and verify commands.

Description of the Related Art

NVMe is a specification defining how host software communicates with NVM across a PCIe bus. The NVMe specification also includes host-to-device protocols for SSD commands used by an operating system regarding operations such as read, write, flush, TRIM, firmware management, temperature, errors, and the like. NVMe utilizes a paired submission queue and completion queue mechanism. Commands are placed by a host device into a submission queue. Completion messages are placed into the associated completion queue by a controller of the data storage device.

NVMe devices support five primary controller level reset mechanisms, such as conventional reset, PCIe transaction layer data link down status, FLR, controller reset, and NVM subsystem reset. Furthermore, the resets include a timing constraint to complete any pending or currently executed commands as well as operations related to the reset. For example, FLR, which is a PCIe reset, may have a timing constraint of about 100 mSec.

The NVMe verify commands require checking the integrity of the content of data on the NVM. While performing the verify command, all transfers to the host may be stopped or the central processing unit (CPU) may be directed to calculate the end-2-end protection information. In either scenario, the latency and/or bandwidth may be hindered.

Therefore, there is a need in the art for an improved handling of reset scenarios and verify command scenarios.

SUMMARY OF THE DISCLOSURE

The present disclosure generally relates to non-volatile memory (NVM) express (NVMe) function level reset (FLR) commands and verify commands. The controller is configured to receive commands from a host device through a PCIe bus having a MAC, send data to the host device through the PCIe bus, and execute a function level reset (FLR) command. The controller includes a direct memory access (DMA) unit and either a drain unit or a drain and drop unit coupled between the DMA and the PCIe bus. The units are configured to prevent transactions associated with the FLR command to pass from the DMA to the MAC during execution of the FLR command, where the preventing transactions comprises receiving a request from the DMA, storing the request in a pipe, removing the request from the pipe, and providing a response to the DMA without delivering the request to the MAC. The drain and drop unit is further configured to drop a MAC generated response. For verify commands, if the command ended due to the drain, then a successful completion message can be sent to the host device, but if the command ended due to both the drain and an end to end protection error, then an unsuccessful completion message can be sent to the host device.

In one embodiment, a data storage device includes a memory device and a controller coupled to the memory device. The controller is configured to receive commands from a host device through a PCIe bus having a MAC, send data to the host device through the PCIe bus, and execute a function level reset (FLR) command. The controller includes a direct memory access (DMA) unit and a drain unit. The drain unit is coupled between the DMA and the PCIe bus. The drain unit is configured to prevent transactions associated with the FLR command to pass from the DMA to the MAC during execution of the FLR command, where the preventing transactions comprises receiving a request from the DMA, storing the request in a pipe, removing the request from the pipe, and providing a response to the DMA without delivering the request to the MAC.

In another embodiment, a data storage device includes a memory device and a controller coupled to the memory device. The controller is configured to receive commands from a host device through a PCIe bus having a MAC, send data to the host device through the PCIe bus, and execute a function level reset (FLR) command. The controller includes a direct memory access (DMA) unit and a drain and drop unit. The drain and drop unit is coupled between the DMA and the PCIe bus. The drain and drop unit is configured to receive a request from the DMA, store the request in a pipe, remove the request from the pipe, provide a response to the DMA, and drop a MAC generated response. The response is provided to the DMA without delivering the request to the MAC.

In another embodiment, a data storage device includes memory means and a controller coupled to the memory means. The controller is configured to receive commands from a host device through a PCIe bus having a MAC, send data to the host device through the PCIe bus, and provide a unique identifier to each command upon receipt. The controller includes a direct memory access (DMA) unit and a drain unit. The drain unit is coupled between the DMA and the PCIe bus. The drain unit is configured to prevent transactions having the unique identifier to pass from the DMA to the MAC.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to non-volatile memory (NVM) express (NVMe) function level reset (FLR) commands and verify commands. The controller is configured to receive commands from a host device through a PCIe bus having a MAC, send data to the host device through the PCIe bus, and execute a function level reset (FLR) command. The controller includes a direct memory access (DMA) unit and either a drain unit or a drain and drop unit coupled between the DMA and the PCIe bus. The units are configured to prevent transactions associated with the FLR command to pass from the DMA to the MAC during execution of the FLR command, where the preventing transactions comprises receiving a request from the DMA, storing the request in a pipe, removing the request from the pipe, and providing a response to the DMA without delivering the request to the MAC. The drain and drop unit is further configured to drop a MAC generated response. For verify commands, if the command ended due to the drain, then a successful completion message can be sent to the host device, but if the command ended due to both the drain and an end to end protection error, then an unsuccessful completion message can be sent to the host device.

Figure 1:
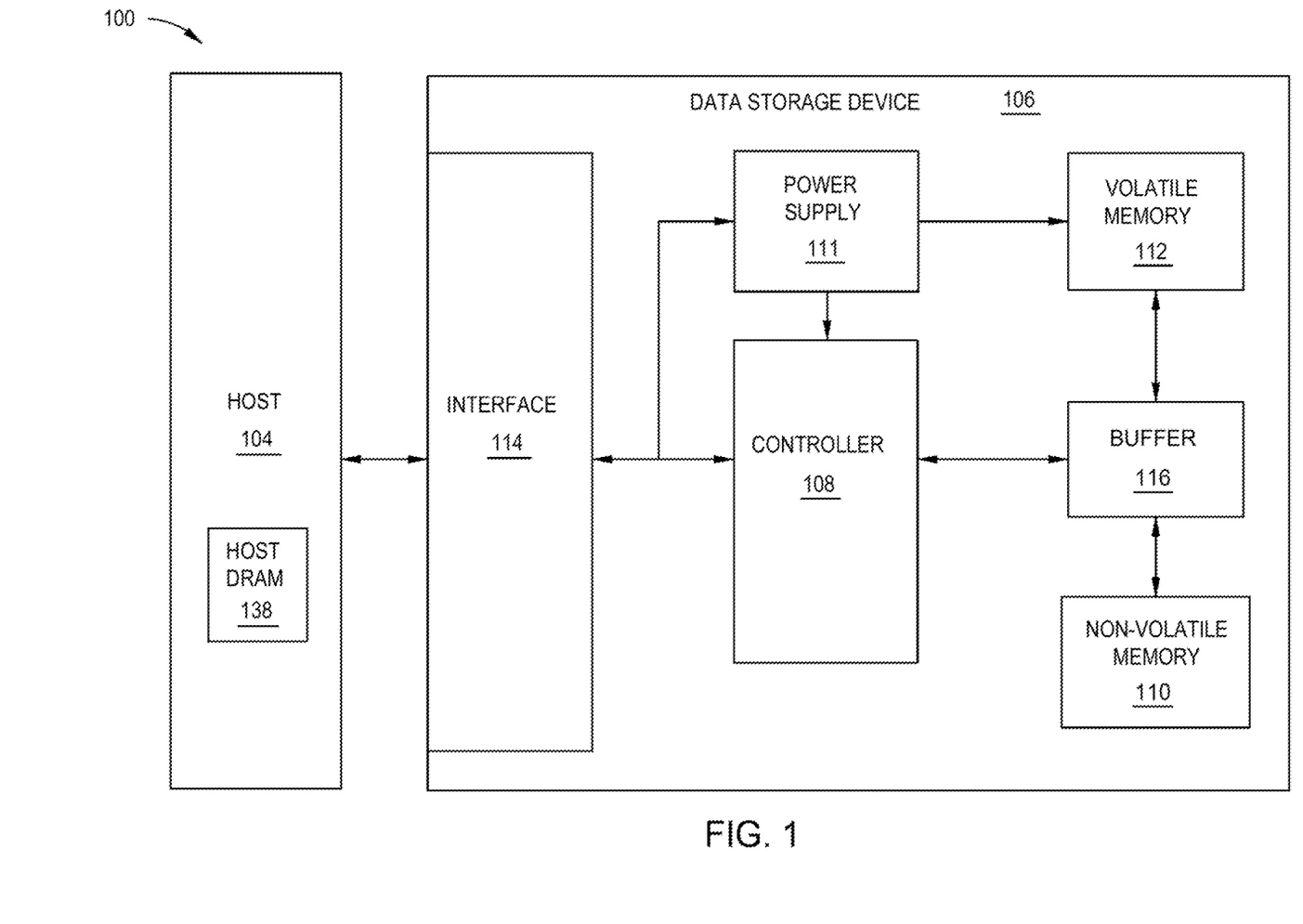
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
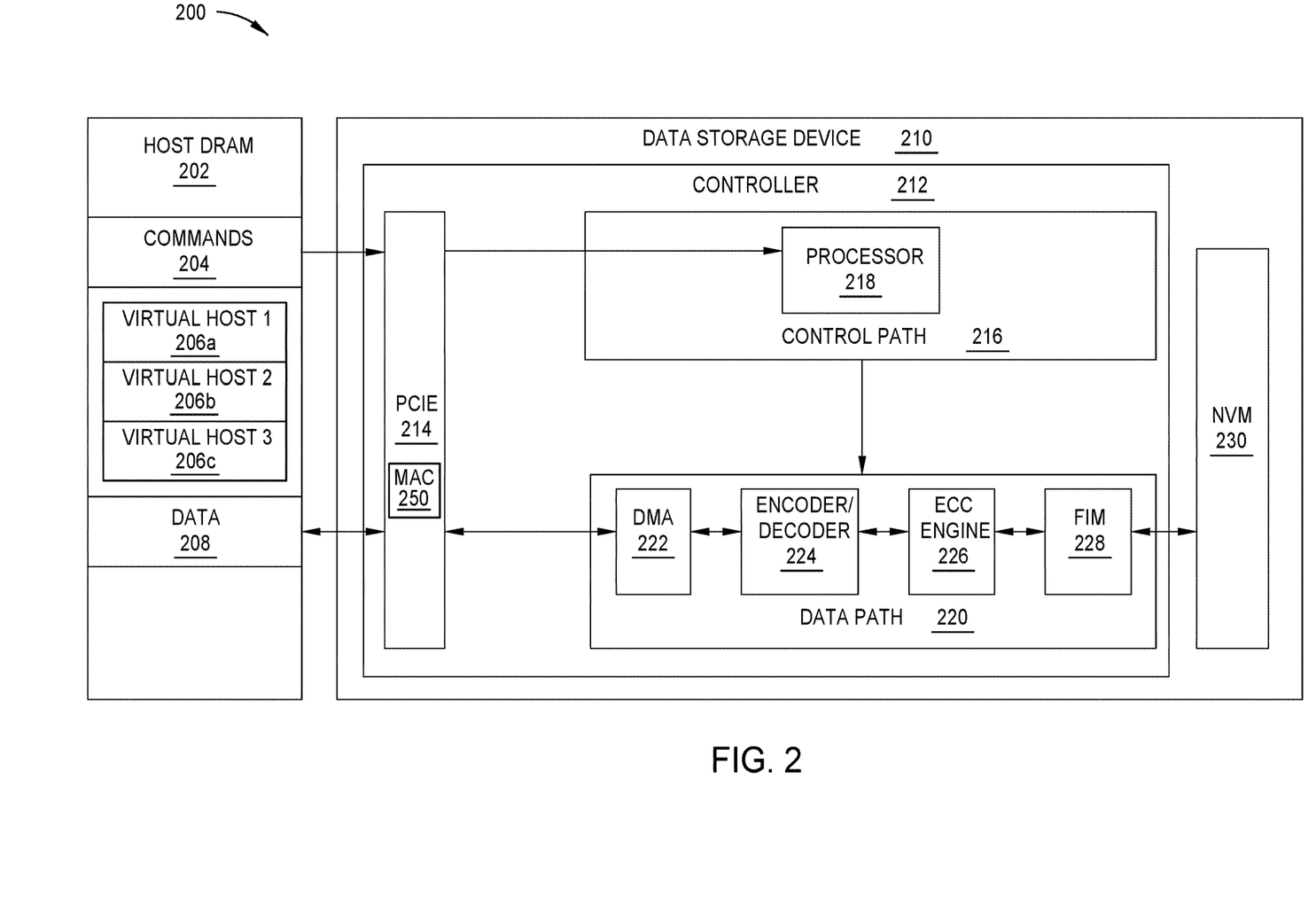
FIG. 2 is a schematic block diagram illustrating a storage system in which a data storage device interacts with a host DRAM, according to certain embodiments.

FIG. 2 is a schematic block diagram illustrating a storage system 200 in which a data storage device 210 interacts with a host DRAM 202 of a host device, according to certain embodiments. Aspects of the storage system 200 may be similar to aspects of the storage system 100 of FIG. 1. For example, the host DRAM 202 may be the host DRAM 138 of the host device 104, the data storage device 210 may be the data storage device 106, a controller 212 may be the controller 108, and an NVM 230 may be the NVM 110. The terms "request," "transaction," and "command" may be used interchangeably herein.

The host DRAM 202 includes a commands partition 204, a data partition 208, and a plurality of virtual hosts 206a-206c (herein referred to as virtual hosts 206 for exemplary purposes). It is to be understood that the plurality of virtual hosts may be one or more virtual hosts and the illustrated number of virtual hosts is not intended to be limiting, but to provide an example of a possible embodiment. Each of the virtual hosts 206 may generate and issue commands, where the generated commands are stored in the commands partition 204 and the data associated with the generated commands are stored in the data partition 208. It is noted that each of the virtual hosts 206 may operate independently of each other or may operate in conjunction with another one of the virtual hosts 206. In one embodiment, each of the virtual hosts 206 may include a separate submission queue and a separate completion queue. In another embodiment, the virtual hosts 206 may include a shared submission queue and a shared completion queue.

Commands stored in the commands partition 204 are sent to the data storage device 210, where a PCIe bus 214 receives the commands. In some embodiments, the PCIe bus 214 may fetch the commands from the commands partition 204 upon receiving a doorbell or an indication from the host device 104 associated with a pending command in the commands partition 204.

The data storage device 210 includes the controller 212 and the NVM 230. The controller 212 includes the PCIe bus 214, a control path 216, and a data path 220. The PCIe bus 214 may be configured to send commands received from the host device 104 to the control path 216 and data received from the host device 104 to the data path 220. The PCIe bus 214 includes a multiplier-accumulator (MAC) unit 250. The MAC unit 250 may be referenced herein as MAC 250 for simplification purposes. It is to be understood that the control path 216 and the data path 220 may include additional elements or similar elements not shown. The control path 216 includes a processor 218. In some embodiments, the control path 216 includes one or more processors. When the processor 218 receives the command, the processor 218 may be configured to determine characteristics of the command, such as target logical block address (LBA), length of the command, and the like, perform any calculations required of the command, and provide instructions related to the command, such as read instructions or write instructions. The processed command is passed from the control path 216 to the data path 220. Furthermore, the processor 218 may trigger the various components of the data path 220.

The data path 220 includes a direct memory access (DMA) 222, an encoder/decoder 224, an error correction code (ECC) engine 226, and a flash interface module (FIM) 228. The DMA 222 may allow for access of the NVM 230 independent of the processor 218 or a central processing unit (CPU). In some examples, the DMA 222 facilitates the access of the NVM 230 to allow data to be programmed to or read from the NVM 230. The encoder/decoder 224 may be configured to encode data prior to being programmed to the NVM 230 and decode data read from the NVM 230. In one embodiment, the encoder/decoder 224 may be separate components of the controller 212, such as an encoder and a decoder.

The ECC engine 226 may be configured to generate ECC data to protect the data programmed to the NVM 238 from errors. It is contemplated that the ECC engine 226 may be another type of data protection engine such as a low-density parity-check (LDPC) engine configured to generate LDPC data or an exclusive or (XOR) parity engine configured to generate XOR parity data. The ECC engine 226 may be configured to generate protection code and execute error correction operations. The FIM 228 may be configured to schedule data to be programmed to the NVM 230, access the NVM 230, and/or schedule data to be read from the NVM 230. The FIM 228 is coupled to the NVM 230.

After the command is processed by the control path 216, the control path 216 may no longer be required to intervene for the processed command. When a reset occurs, such as a FLR, the relevant virtual hosts (e.g., the virtual hosts 206) stop sending command to the data storage device 210. However, commands already processed and sent to the data path 220 still needs to be executed and completed. Therefore, when the reset occurs, the pending commands may prolong the reset time.

When a controller level reset occurs, the data storage device 210 completes one or more activities. The controller level reset may be a FLR, where the FLR is handled on a per function basis. For example, the controller 212 may stop processing any outstanding admin or input/output (I/O) commands, all the I/O submission queues are deleted, all the I/O completion queues are deleted, the controller 212 enters an idle state (and the CSTS.RDY is cleared to '0'), the controller registers and internal controller state are reset while the admin queue registers, such as AQA, ASQ, or ACQ) are not reset, and the like. Likewise, when the reset occurs, the controller 212 may flush all cache data to the NVM 230 and update the flash translation layer (FTL) tables.

When the reset has completed, the host device 104 re-initializes the data storage device 210 by updating the register state as appropriate, setting CC.EN to '1', waiting for CSTS.RDY to be set as '1', configuring the controller 212 using admin commands as needed, generating I/O completion queues and I/O submission queues, and proceeding with normal I/O operations.

In some examples, selective FLR is required when one or more virtual hosts 206 requests to reset only part of the data storage device 210. Therefore, the non-requested parts or components remain operating as normal. Because only part of the data storage device 210 is reset, commands may still be sent by other virtual hosts 206 (e.g., the virtual hosts that did not send the reset request). Furthermore, the data storage device 210 may be configured to use a host memory buffer (HMB) of the host DRAM 202. When the one or more virtual hosts 206 resets the data storage device 210, the components or activities utilizing the HMB should remain viable for the data storage device 210. Function partitioning may be done for hundreds of partitions. However, it may not be feasible to implement dedicated HW per partition or function. Instead, the data path 210 may utilize the same engines to support all functions. In one embodiment, the data storage device includes separation of functions. In another embodiment, the data storage device does not include separation of functions.

Figure 3:
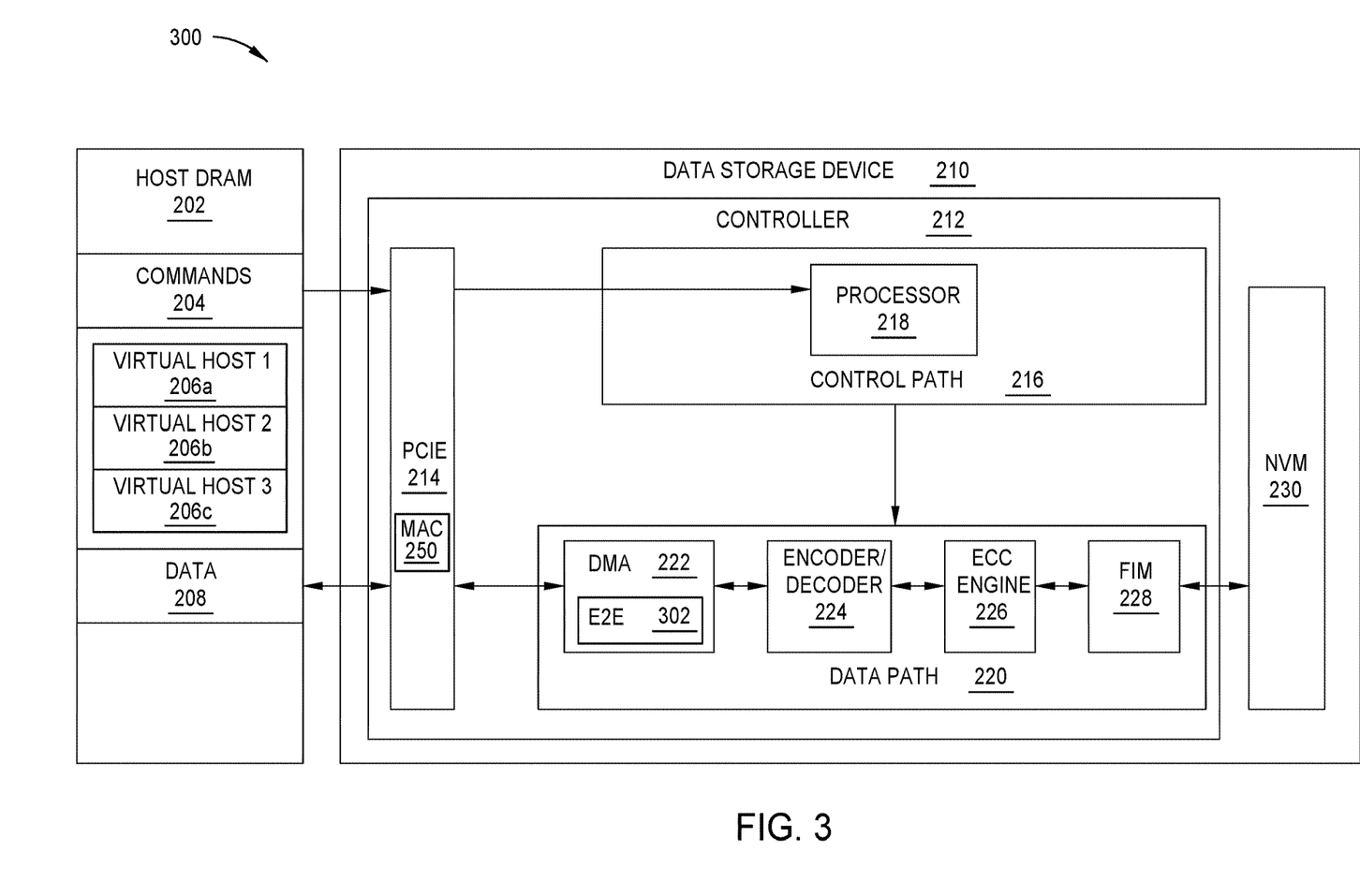
FIG. 3 is a schematic block diagram illustrating a storage system in which a data storage device interacts with a host DRAM, according to certain embodiments.

FIG. 3 is a schematic block diagram illustrating a storage system 300 in which a data storage device 210 interacts with a host DRAM 202 of a host device, according to certain embodiments. Aspects of the storage system 300 may be similar to aspects of the storage system 200 of FIG. 2. For exemplary purposes, identical reference numerals are used for identical elements or components that are common to both the storage system 200 and the storage system 300. The DMA 222 includes end-2-end (E2E) protection 302, where the E2E protection 302 is located as close to the host interface as possible. The illustrated location of the E2E protection 302 is not intended to be limiting, but a possible embodiment. The E2E protection 302 may include counters, timeouts, and data IDs. The E2E protection 302 may protect the data from transmission failures and the like.

Figure 4:
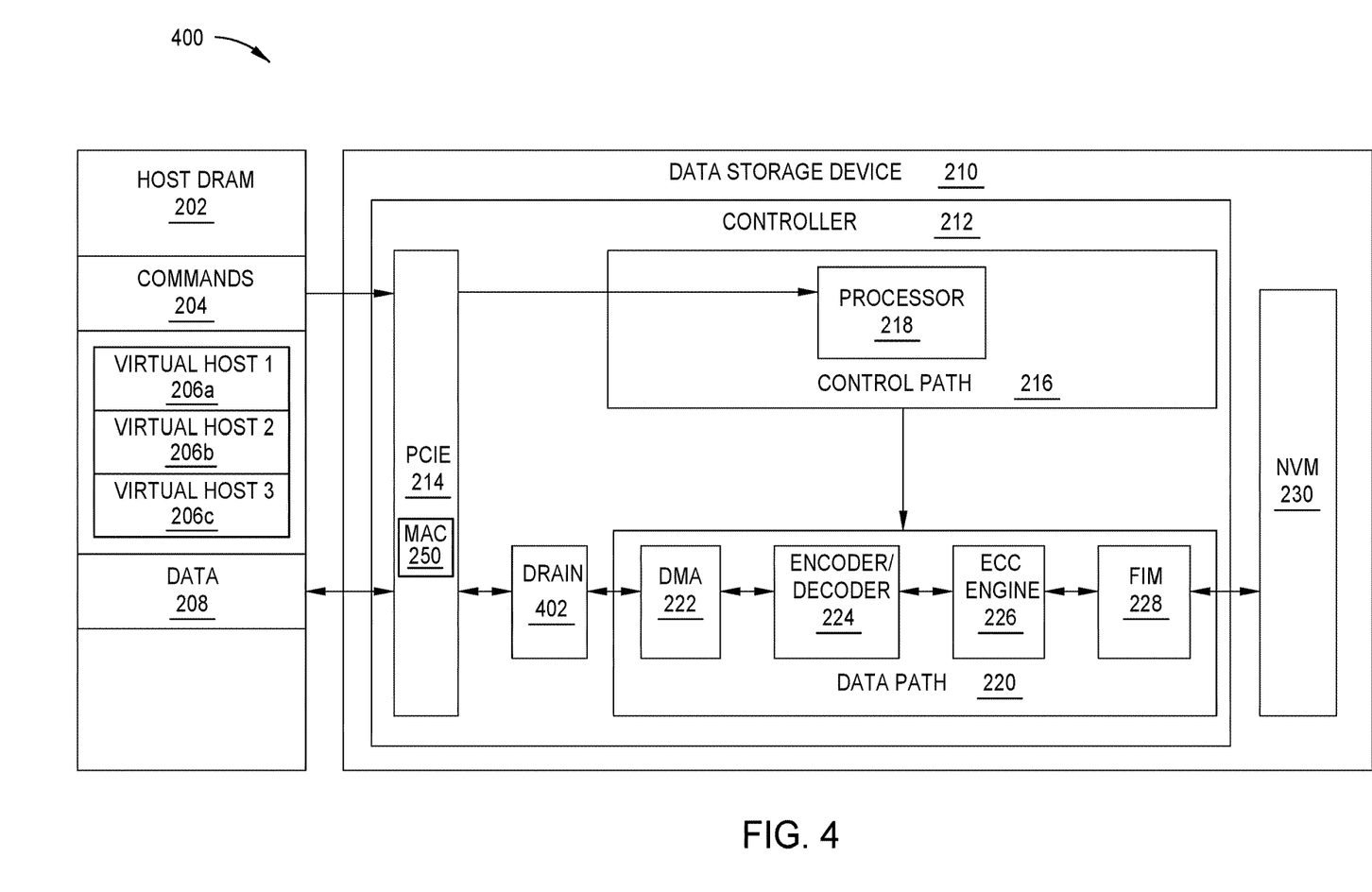
FIG. 4 is a schematic block diagram illustrating a storage system in which a data storage device interacts with a host DRAM, according to certain embodiments.

FIG. 4 is a schematic block diagram illustrating a storage system 400 in which a data storage device 210 interacts with a host DRAM 202 of a host device, according to certain embodiments. Aspects of the storage system 400 may be similar to aspects of the storage system 200 of FIG. 2. For exemplary purposes, identical reference numerals are used for identical elements or components that are common to both the storage system 200 and the storage system 400. The controller 212 further includes a drain unit 402, where the drain unit 402 is coupled between the PCIe bus 214 and the DMA 222. Therefore, the PCIe bus 214 is decoupled from the DMA 222. The DMA 222 may include the E2E protection 302 of FIG. 3. The drain unit 402 is configured to prevent transactions associated with a FLR command to pass from the DMA 222 to the MAC 250 during execution of the FLR command, where the preventing transactions comprises receiving a request from the DMA 222, storing the request in a pipe, removing the request from the pipe, and providing a response to the DMA 222 without delivering the request to the MAC 250.

When a FLR command is received by the processor 218 and passed to the data path 220, the drain unit 402 may be configured to prevent transactions associated with a FLR command to pass from the DMA 222 to the MAC 250 of the PCIe bus 214 and generate a response associated with the prevented transactions. The drain unit 402 may still allow transactions or commands not associated with the virtual host (e.g., a virtual host of the plurality of virtual hosts 206a-206c) issuing the FLR command to be passed from the DMA 222 to the MAC 250 of the PCIe bus 214. Prior to the PCIe bus 214 receiving responses from the drain unit 402, the drain unit 402 may store received transactions until the stored read and write commands of the PCIe bus 214 are executed.

Figure 5:
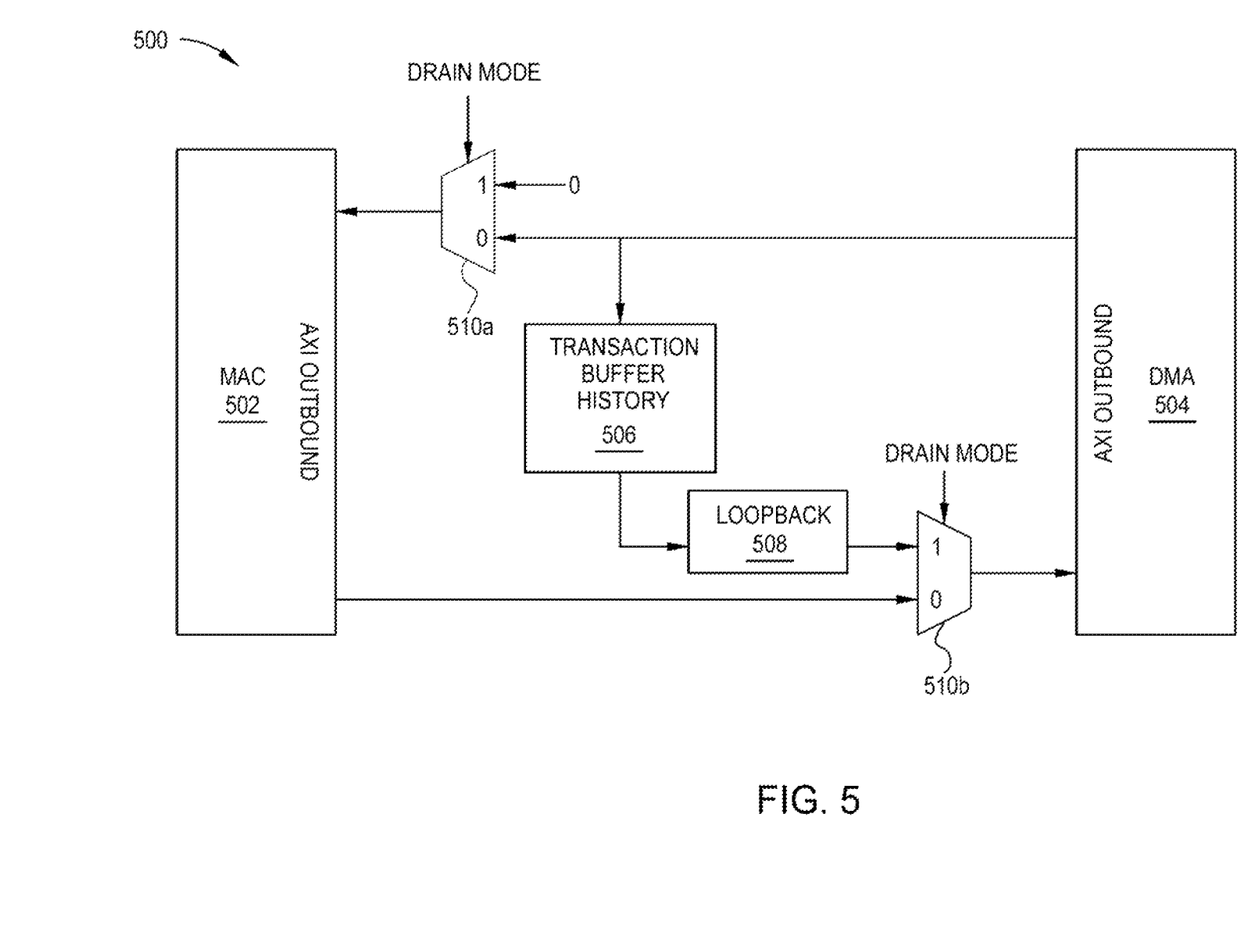
FIG. 5 is a schematic block diagram illustrating a drain model, according to certain embodiments.

FIG. 5 is a schematic block diagram illustrating a drain model 500, according to certain embodiments. The drain model 500 may be utilized by the drain unit 402 of FIG. 4. The drain model 500 includes a MAC 502, a DMA 504, a transaction buffer history 506, a loopback 508, a first multiplexer (mux) 510a, and a second mux 510b. The MAC 502 may be the MAC 250 of the PCIe bus 214 of FIG. 2. The DMA 504 allows a host device, such as the host device 104 of FIG. 1, to control different virtual machines of a data storage device, such as the data storage device 210 of FIG. 2.

The first mux 510a and the second mux 510b includes a drain mode bit selector. When the drain mode is selected, the transactions associated with a FLR command, for example, are prevented from passing from the DMA 504 to the MAC 502 or vice-versa. The prevented transactions are stored in the transaction buffer history 506 and the loopback 508 generates responses for the prevented transactions. For example, when the DMA 504 sends transactions to the MAC 502, the transactions are kept in the transaction history buffer 506. If the transaction should be drained (e.g., either an entire NVMe function or a specific function), the transaction should not go to the MAC 502. However, if the transaction is not associated with an FLR command, the transaction is passed to the MAC 502. The loopback 508 generates responses to the DMA 504 requests based on the transaction history buffer. However, the responses are provided to the DMA 504 if the transactions did not go to the MAC 502. If the transactions did get delivered to the MAC 502, then a response from the MAC 502 is received by the DMA 504 rather than a response for that transaction from the loopback 508. Thus, the data path, such as the data path 220 of FIG. 2 may be cleared more efficiently in a reset, such as a FLR, scenario.

Figure 6:
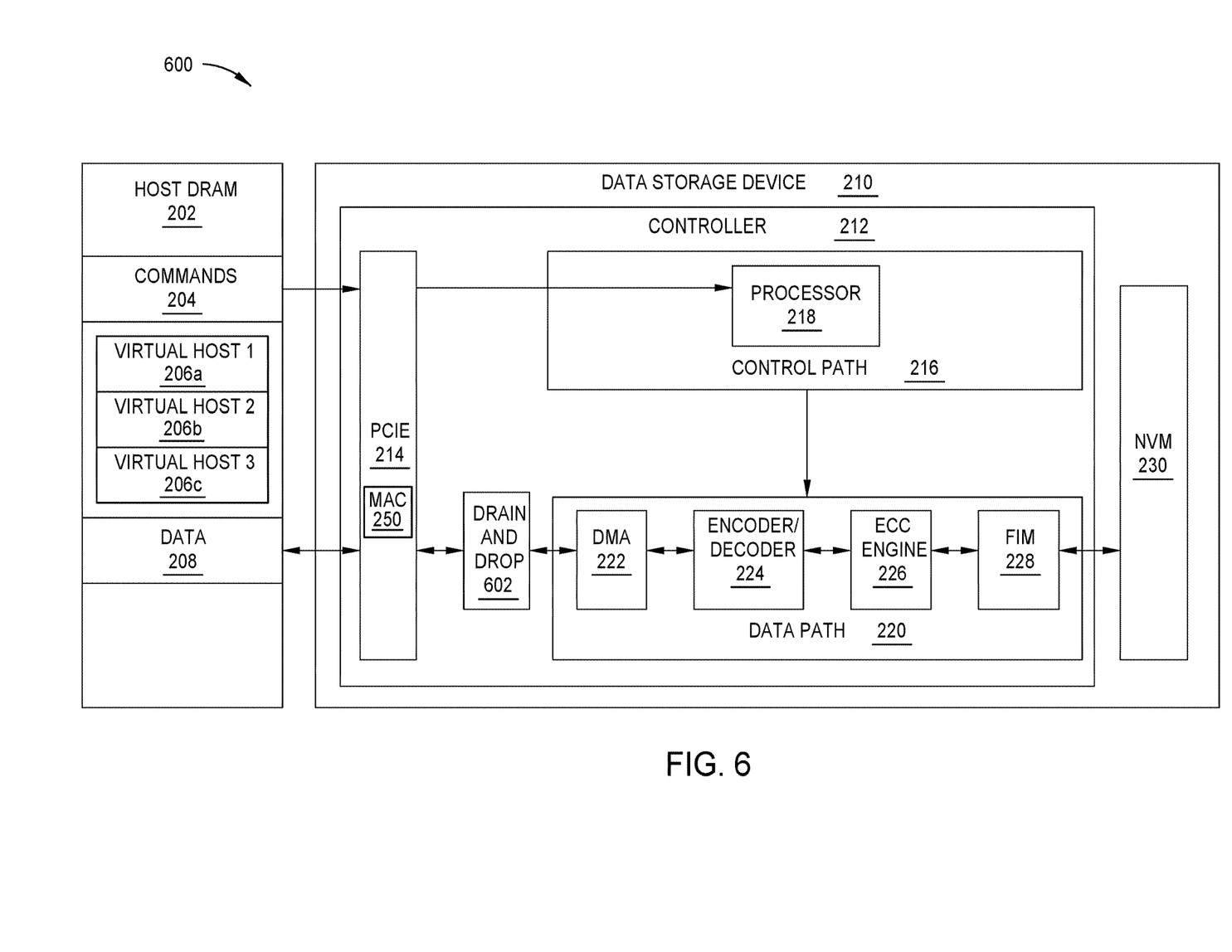
FIG. 6 is a schematic block diagram illustrating a storage system in which a data storage device interacts with a host DRAM, according to certain embodiments.

FIG. 6 is a schematic block diagram illustrating a storage system 600 in which a data storage device 210 interacts with a host DRAM 202 of a host device, according to certain embodiments. Aspects of the storage system 600 may be similar to aspects of the storage system 200 of FIG. 2. For exemplary purposes, identical reference numerals are used for identical elements or components that are common to both the storage system 200 and the storage system 600. The controller 212 includes a drain and drop unit 602. The drain and drop unit 602 is coupled between the PCIe 214 and the DMA 222, such that the PCIe and the DMA 222 are decoupled. The drain and drop unit 602 may be the drain unit 402 of FIG. 4 with an additional drop component or logic. Furthermore, the DMA 222 may include the E2E protection 302 of FIG. 3. The drain and drop unit 602 is configured to prevent transactions associated with a FLR command to pass from the DMA 222 to the MAC 250 during execution of the FLR command, where the preventing transactions comprises receiving a request from the DMA 222, storing the request in a pipe, removing the request from the pipe, and providing a response to the DMA 222 without delivering the request to the MAC 250. The drain and drop unit 602 is further configured to drop a MAC generated response.

When a host device, such as the host device 104 of FIG. 1, requests an FLR to occur for one or more functions, the drain and drop unit 602 may return responses to the DMA 222 prior to the PCIe bus 214 providing a response to the request. When the drain and drop unit 602 receives a response from the PCIe bus 214 in response to a request, the drain and drop unit 602 consumes or erases the response. Thus, the response is not passed from the drain and drop unit 602 to the DMA 222. By utilizing the drain and drop unit 602 (or in some embodiments, the drain unit 402), the pipes (e.g., the queues that are store the processed, but not yet executed commands) may be cleared (completed) at a faster rate without needing to receive a response from the PCIe bus 214.

Figure 7A:
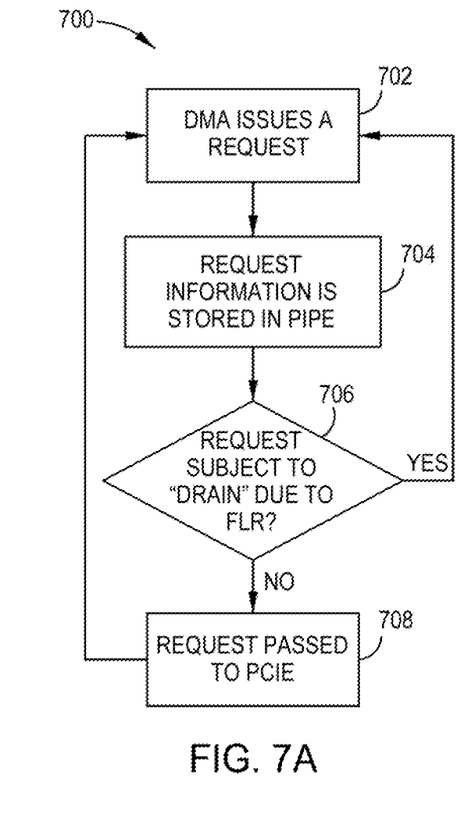
FIGS. 7A-7C are flow diagrams illustrating methods of an operation of a drain and drop unit, according to certain embodiments.
Figure 7B:
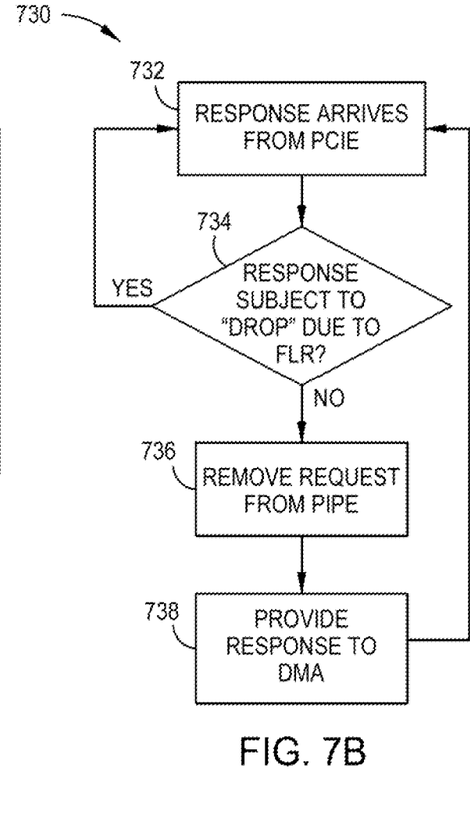
Figure 7C:
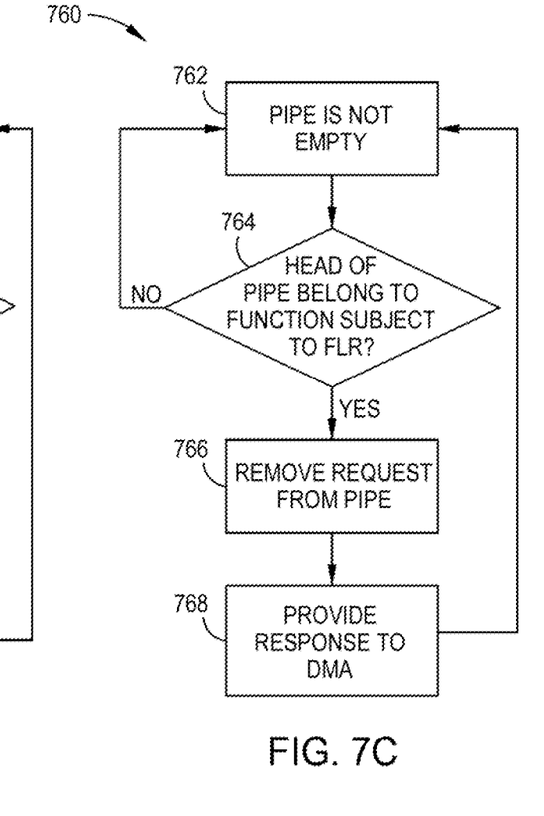

FIGS. 7A-7C are flow diagrams illustrating methods 700, 730, 760 of an operation of a drain and drop unit, such as the drain and drop unit 602 of FIG. 6, according to certain embodiments. Aspects of the storage system 600 may be referenced for exemplary purposes. In some embodiments, methods 700, 730, and 760 may be applicable to the drain unit 402 of FIG. 4.

Referring to method 700, the DMA 222 issues a request to the PCIe bus 214 at block 702. At block 704, the request information is stored in a pipe. The pipe may be a queue of the drain and drop unit 602, such as the transaction buffer history 506 of FIG. 5. The storing of the request information allows for a response to be generated, such as by the loopback 508 of FIG. 5, so that the response may be utilized by methods 730 and 760. At block 706, the controller 212 determines if the request is subject to "drain" due to a FLR command. If the request is subject to "drain" due to the FLR command at block 706, then method 700 returns to block 702. However, if the request is not subject to "drain" due to the FLR command at block 708, the request is passed to the PCIe bus 214 at block 708.

Referring to method 730, a response arrives at the drain and drop unit 602 from the PCIe bus 214 at block 732. At block 734, the controller 212 determines if the response is subject to "drop" due to a FLR command. If the response is subject to "drop" due to the FLR command at block 734, then the response is ignored and the response may be handled by method 760 and method 730 returns to block 732. However, if the response is not subject to "drop" due to the FLR command at block 734, the request is removed from the pipe at block 736 and the response is provided to the DMA 222 at block 738. Method 730 returns to block 732.

Referring to method 760, the controller 212 determines that the pipe is not empty at block 762. The controller 212 determines if the head of the pipe belongs to a function subject to a FLR command at block 764. If the head (e.g., a first request of the pipe) of the pipe does not belong to a function subject to the FLR command at block 764, then method 760 returns to block 762. However, if the head of the pipe does belong to a function subject to the FLR command at block 764, then the request is removed from the pipe at block 766. At block 768, the response associated with the request is provided to the DMA 222.

In some embodiments, methods 700, 730, and 760 may be applicable verify commands. For example, when the host device 104 sends a command to the controller 212. When the command is a verify command, the command is marked or provided (e.g., tagged) with a unique identifier, such as an iTag. The identifier is used throughout the lifespan of the command. Similar to the FLR, where each request may be marked for drain and drop separately, the controller 212 may mark each command for drain and drop. In the case of a verify command, the controller 212 may set a "drain" indication or a "drain and drop" indication for the relevant iTag. Methods 700, 730, and 760 are applied to the verify commands. When the request to transfer data arrives the drain model, such as the drain model 500 of FIG. 5, the drain unit 402, or the drain and drop unit 602 checks for a "drain indication" tag.

If the "drain" indication or the "drain and drop" indication is detected or present, the drain unit 402 or the drain and drop unit 602 consumes the relevant transfers. After consuming the relevant transfers, an error indication relating to the command is sent to the control path 216. The processor 218 determines if the command ended either due to drain or due to both drain and E2E protection error.

For verify commands and other commands where data transfer is not required, if the command ended due to drain, then the controller 212 may report a successful completion message back to the host device 104. However, if the command ended to both drain and E2E protection error, then the controller 212 may report a bad (or unsuccessful) completion message to the host device 104. However, if the "drain" indication or the "drain and drop" indication is not detected or present, the relevant transfers are provided to the MAC 250 of the PCIe bus 214. Generally, commands that end with a "drain" indication do not need to complete successfully since general commands are required to send data.

By decoupling the MAC of the PCIe bus and the DMA, the handling of reset scenarios, such as FLR, and verify commands may be accelerated. Thus, the performance of the data storage device may be improved.

In one embodiment, a data storage device includes a memory device and a controller coupled to the memory device. The controller is configured to receive commands from a host device through a PCIe bus having a MAC, send data to the host device through the PCIe bus, and execute a function level reset (FLR) command. The controller includes a direct memory access (DMA) unit and a drain unit. The drain unit is coupled between the DMA and the PCIe bus. The drain unit is configured to prevent transactions associated with the FLR command to pass from the DMA to the MAC during execution of the FLR command, where the preventing transactions comprises receiving a request from the DMA, storing the request in a pipe, removing the request from the pipe, and providing a response to the DMA without delivering the request to the MAC.

The drain unit is configured to permit transactions not associated with the FLR command to pass from the DMA to the MAC during execution of the FLR command. The drain unit is configured to store the prevented transactions in a transaction history buffer. The drain unit is configured to generate responses for the prevented transactions. The responses are delivered to the DMA without delivering the request to the MAC. The controller further includes an encoder/decoder, an error correction module, and a flash interface module (FIM). The encoder/decoder, error correction module, FIM, and DMA are all disposed along a data path in the controller. The controller further includes a processor. The processor is disposed along a control path and is coupled to the PCIe bus.

In another embodiment, a data storage device includes a memory device and a controller coupled to the memory device. The controller is configured to receive commands from a host device through a PCIe bus having a MAC, send data to the host device through the PCIe bus, and execute a function level reset (FLR) command. The controller includes a direct memory access (DMA) unit and a drain and drop unit. The drain and drop unit is coupled between the DMA and the PCIe bus. The drain and drop unit is configured to receive a request from the DMA, store the request in a pipe, remove the request from the pipe, provide a response to the DMA, and drop a MAC generated response. The response is provided to the DMA without delivering the request to the MAC.

The controller is further configured to determine whether the request is subject to the FLR command. The controller is further configured to pass the request to the PCIe bus upon determining that the request is not subject to the FLR command. The controller is further configured to receive a response from the PCIe bus, determine that the response is not subject to the FLR command, and provide the response to the DMA. The controller is further configured to receive a response from the PCIe bus and determine that the response is subject to the FLR command. The controller is further configured to determine that the pipe is not empty, determine that a head of the pipe is subject to the FLR command, and remove the request from the pipe. The controller is further configured to provide a response to the DMA upon determining that the head of the pipe is subject to the FLR command. The controller is further configured to determine that the pipe is not empty and determine that a head of the pipe is not subject to the FLR command.

In another embodiment, a data storage device includes memory means and a controller coupled to the memory means. The controller is configured to receive commands from a host device through a PCIe bus having a MAC, send data to the host device through the PCIe bus, and provide a unique identifier to each command upon receipt. The controller includes a direct memory access (DMA) unit and a drain unit. The drain unit is coupled between the DMA and the PCIe bus. The drain unit is configured to prevent transactions having the unique identifier to pass from the DMA to the MAC.

The unique identifier indicates the command should not access the interface to the host (i.e., verify command). The controller is further configured to provide an error indication to firmware indicating commands with the unique identifier were consumed in the drain. The drain unit is configured to permit commands that do not have the unique identifier to pass from the DMA to the MAC. The unique identifier is utilized throughout a lifespan of the command to which the unique identifier is provided.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive commands from a host device through a PCIe bus having a multiplier-accumulator (MAC);
send data to the host device through the PCIe bus; and
execute a function level reset (FLR) command, wherein the controller comprises a direct memory access (DMA) unit and a drain unit, wherein the drain unit is coupled between the DMA and the PCIe bus, and wherein the drain unit is configured to prevent transactions associated with the FLR command to pass from the DMA to the MAC during execution of the FLR command, and wherein the preventing transactions comprises receiving a request from the DMA, storing the request in a pipe, removing the request from the pipe, and providing a response to the DMA without delivering the request to the MAC.

2. The data storage device of claim 1, wherein the drain unit is configured to permit transactions not associated with the FLR command to pass from the DMA to the MAC during execution of the FLR command.

3. The data storage device of claim 1, wherein the drain unit is configured to store the prevented transactions in a transaction history buffer.

4. The data storage device of claim 1, wherein the drain unit is configured to generate responses for the prevented transactions.

5. The data storage device of claim 4, wherein the responses are delivered to the DMA without delivering the request to the MAC.

6. The data storage device of claim 1, wherein the controller further comprises:
an encoder/decoder;
an error correction module; and
a flash interface module (FIM), wherein the encoder/decoder, error correction module, FIM, and DMA are all disposed along a data path in the controller.

7. The data storage device of claim 6, wherein the controller further comprises a processor, wherein the processor is disposed along a control path and is coupled to the PCIe bus.

8. A data storage device, comprising:
a memory device; and
a controller coupled to the memory device, wherein the controller is configured to:
receive commands from a host device through a PCIe bus having a multiplier-accumulator (MAC);
send data to the host device through the PCIe bus; and
execute a function level reset (FLR) command, wherein the controller comprises a direct memory access (DMA) unit and a drain and drop unit, wherein the drain and drop unit is coupled between the DMA and the PCIe bus, and wherein the drain and drop unit is configured to:
receive a request from the DMA;
store the request in a pipe;
remove the request from the pipe; and
provide a response to the DMA, wherein the response is provided to the DMA without delivering the request to the MAC; and
drop a MAC generated response.

9. The data storage device of claim 8, wherein the controller is further configured to determine whether the request is subject to the FLR command.

10. The data storage device of claim 8, wherein the controller is further configured to pass the request to the PCIe bus upon determining that the request is not subject to the FLR command.

11. The data storage device of claim 8, wherein the controller is further configured to receive a response from the PCIe bus, determine that the response is not subject to the FLR command, and provide the response to the DMA.

12. The data storage device of claim 8, wherein the controller is further configured to receive a response from the PCIe bus and determine that the response is subject to the FLR command.

13. The data storage device of claim 8, wherein the controller is further configured to determine that the pipe is not empty, determine that a head of the pipe is subject to the FLR command, and remove the request from the pipe.

14. The data storage device of claim 13, wherein the controller is further configured to provide a response to the DMA upon determining that the head of the pipe is subject to the FLR command.

15. The data storage device of claim 8, wherein the controller is further configured to determine that the pipe is not empty and determine that a head of the pipe is not subject to the FLR command.

16. A data storage device, comprising:
means for storing data; and
a controller coupled to the means for storing data, wherein the controller is configured to:
receive commands to access the means for storing data from a host device through a PCIe bus having a multiplier-accumulator (MAC);
send data to the host device through the PCIe bus; and
provide a unique identifier to each command upon receipt, wherein the controller comprises a direct memory access (DMA) unit and a drain unit, wherein the drain unit is coupled between the DMA and the PCIe bus, and wherein the drain unit is configured to prevent transactions having the unique identifier to pass from the DMA to the MAC.

17. The data storage device of claim 16, wherein the unique identifier indicates the command should not access an interface to a host device.

18. The data storage device of claim 16, wherein the controller is further configured to provide an error indication to firmware indicating commands with the unique identifier were consumed in the drain.

19. The data storage device of claim 16, wherein the drain unit is configured to permit commands that do not have the unique identifier to pass from the DMA to the MAC.

20. The data storage device of claim 16, wherein the unique identifier is utilized throughout a lifespan of the command to which the unique identifier is provided.

* * * * *